June 9, 1964 — R. R. GUNDERSON — 3,136,511
HIGHWAY WARNING SIGNAL
Filed Feb. 28, 1961 — 2 Sheets-Sheet 1
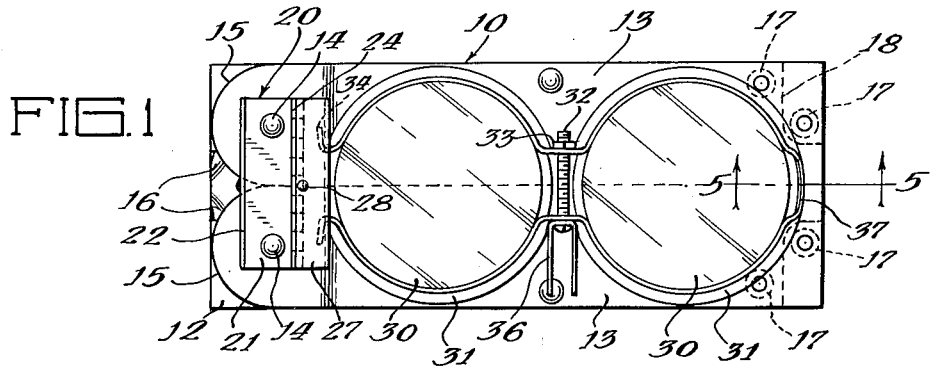
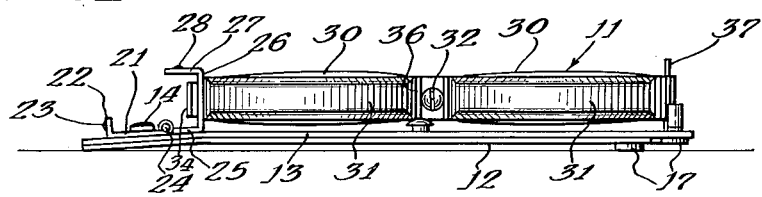
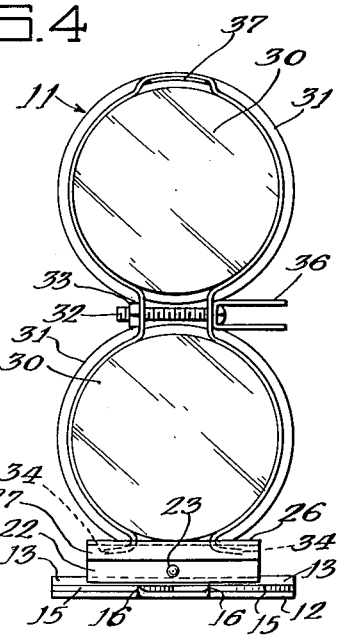
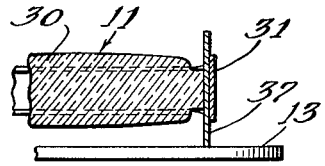
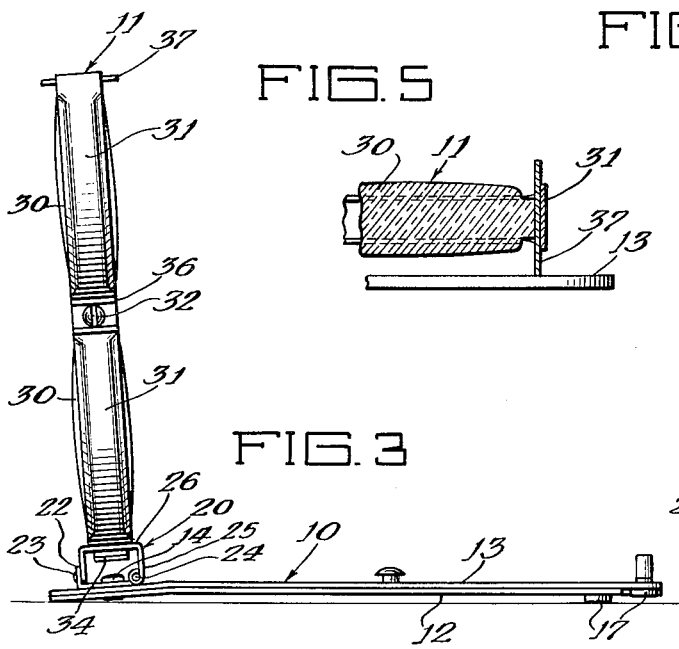
Inventor:
Ralph R. Gunderson
By Hofgren, Brady, Wegner,
Allen & Stellman
Attorneys

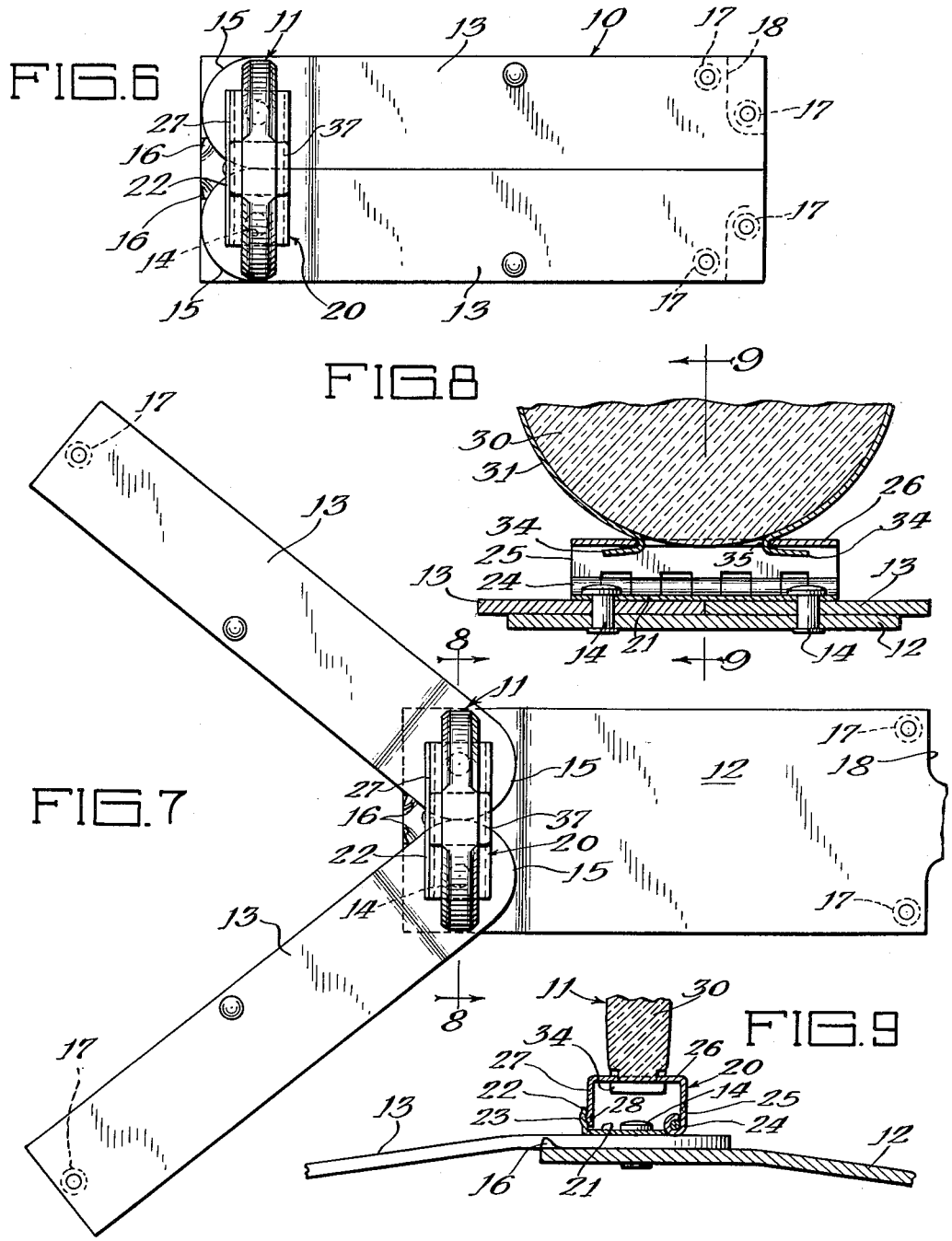

United States Patent Office 3,136,511
Patented June 9, 1964

3,136,511
HIGHWAY WARNING SIGNAL
Ralph R. Gunderson, 5520 South Shore Drive,
Chicago, Ill.
Filed Feb. 28, 1961, Ser. No. 92,258
5 Claims. (Cl. 248—33)

This invention relates to highway warning signals, and more particularly to warning signals which are swingably mounted for movement from a retracted position an an upright latched operative position.

The primary object of the present invention is to provide a new and improved foldable highway warning signal adapted to be carried by highway vehicles.

Another object is to provide a warning signal having a novel latching mechanism for securing the warning signal in upright position and for additionally providing a mounting surface for the signaling element of the warning signal.

A further object is to provide a warning signal having latch means for securing the signaling element in upright position and for spacing adjacent warning signals stacked in stored position.

The invention is illustrated in a preferred embodiment in the accompanying drawings, in which:

FIG. 1 is a top plan view of the warning signal in retracted or stored position;

FIG. 2, a side elevational view of the warning signal shown in FIG. 1;

FIG. 3, a side elevational view of the warning signal with the signaling element in upright operative position, but with the legs of the base portion in retracted position;

FIG. 4, an end elevational view taken from the left of FIG. 3;

FIG. 5, an enlarged fragmentary sectional view taken as indicated on line 5—5 of FIG. 1;

FIG. 6, a top plan view of the warning signal shown in FIG. 3;

FIG. 7, a top plan view similar to FIG. 6, but showing the leg members of the supporting base swung forwardly to supporting position;

FIG. 8, an enlarged fragmentary sectional view taken as indicated on line 8—8 of FIG. 7; and FIG. 9, a sectional view taken as indicated on line 9—9 of FIG. 8.

In the embodiment illustrated, a supporting base or base assembly, generally designated 10, is provided with a warning signal frame or signaling element, generally designated 11, which is swingably secured to the front end portion of the supporting base 10 so that the signaling device can be swung forwardly from its retracted position, as shown in FIG. 1, to its upright operative position, shown in FIG. 3.

The supporting base assembly 10 is preferably provided with a first supporting leg or base portion 12 and with a pair of superposed auxiliary or secondary supporting legs 13. The secondary supporting legs 13 are each pivotally secured at one end to the front end portion of the base portion 12 by a rivet 14 to afford swinging movement of the secondary supporting legs forwardly from retracted position shown in FIG. 1 to extend supporting position shown in FIG. 7. The attached ends of the legs 13 may be rounded on a radius, as at 15, so that the legs are freely swingable and yet mutually support each other at their pivoted ends when in extended position. In order to limit the forward swing of the legs 13 to their proper supporting position, a pair of upwardly struck stop members 16 are bent upwardly from the base portion 12 so as to each abut an edge of a secondary supporting leg 13, as shown in FIG. 7.

The base portion 12 and each of the secondary supporting legs 13 are preferably provided with a number of rubber feet 17 upon which the supporting base 10 rests when its legs are swung to extended position. The base portion 12 may be cut-away as at 18 at its rear end portion to accommodate the rubber feet of the legs 13, as shown in FIG. 1.

The present warning signal is provided with a latching mechanism, generally designated 20, which secures the signaling element 11 in upright position and which also affords a mounting surface for that signaling element. To this end, a latch or base plate 21 is provided at the forward end of the supporting base 10 and is preferably secured in position on the supporting base 10 by the rivets 14. Thus the rivets or pins 14 serve the dual purpose of retaining the latch plate 21 in position and, at the same time, of securing the auxiliary supporting legs 13 in swingable relation with the first supporting leg 12 of the supporting base assembly 10.

A forward edge 22 of the latch plate 21 may be turned upwardly, as best shown in FIG. 2, and may be provided with a latching detent 23. The rear edge of the latch plate 21 is formed to afford a hinged connection 24 with a first leg 25 of a signal frame support or mounting bracket 26, preferably U-shaped in cross section as shown in FIG. 2. The free leg 27 of the mounting bracket 26 may have a cooperating detent 28 which is positioned to make latching engagement with the detent 23 of the upturned forward edge 22 when the mounting bracket is swung forwardly, with the free end of the leg 27 preferably abutting the exposed surface of the latch plate 21.

The signaling element or warning signal frame 11 is secured to the mounting bracket 26 so that forward movement of the signaling element from retracted position (FIG. 1) to upright operative position (FIG. 3) carries the mounting bracket 26 forwardly also into latched position. The signaling element 11 may be provided with two pairs of outwardly facing, light-reflecting plastic lenses 30 which are embraced throughout a major portion of their peripheral edges by a bezel 31, as best shown in FIGS. 1 and 4. The intermediate portions of the bezel 31 are clamped in firm embrace about the lenses 30 by an elongated bolt 32 and its nut 33. The bolt 32 extends between the pairs of lenses 30 and through appropriate apertures in opposed faces of the bezel 31 to assist in holding the lenses in operative relationship with the bezel. The free ends 34 of the bezel are each preferably of a size to pass through an elongated transverse slot 35 formed in the mounting bracket 26 so that each of the free ends can be bent transversely, as shown in FIG. 1 to hold the signaling element 11 in fixed relation with respect to the mounting bracket 26. It should also be noted that the mounting bracket 26 and its slot 35 are so arranged that a portion of the peripheral edge of one of the pairs of lenses extends into the slot 35, as best shown in FIG. 8. If desired, a U-shaped apertured bracket 36 may be provided to hold a thin staff of a warning flag, not shown herein.

In using the warning signals on the highway, it is preferred that one signal be placed at the stalled vehicle and second and third signals be placed along the highway a substantial distance in either direction from the stalled vehicle. To this end, the warning signals are usually stored in stacks of three signals each. The warning signal of the present invention is particularly well-adapted to such stacking while affording full protection to the plastic reflecting lenses. As best shown in FIG. 2, a spacer element 37 is provided. This spacer element extends upwardly at one end beyond the exposed faces of the lenses, and provides a support at its opposite end which spaces the lower lens surfaces from the upper surface of the supporting base 10 when in retracted position. Thus, when a warning signal in retracted position, as shown in FIG. 2, is placed over a second warning signal, one of the supporting bases 10 rests upon the upper end of the spacer element 37 and upon the upper surface of the free leg 27 of the mounting bracket 26 so as to space superposed warning signals one from the other.

It should be noted that the structure of the present invention affords increased stability to the warning signal frame 11 in upright position. To this end, the latch portions of the signal frame support 26 and the latch plate 21 are spaced longitudinally of the supporting base assembly 10 when the warning signal frame 11 is swung into upright operative position.

The foregoing detailed description is given for clearness of understanding only and no unnecessary limitations should be understood therefrom for some modifications will be obvious to those skilled in the art.

I claim:

1. A foldable support for a warning signal, comprising: a supporting base assembly having a first supporting leg and a pair of secondary supporting legs each provided with a pin for pivotally securing said secondary supporting legs to said first supporting leg, said secondary legs being juxtaposed with said first leg when in retracted position and being swingable forwardly to a laterally spaced supporting position; a latch plate secured to said supporting base by said pins of the secondary legs; a signal frame support swingably connected to said latch plate, said support being provided with a signal frame mounting surface; a warning signal frame secured to said mounting surface and swingable with said signal frame support from a retracted position adjacent said supporting base to an upright signaling position; and co-operating latch portions on said signal frame support and on said latch plate for latching said signal frame in upright signaling position.

2. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced supporting position; a signal frame support of channel-shaped configuration affording front and rear leg portions and extending transversely of the front end portion of the supporting base assembly, the rear leg portion being hingedly connected to the supporting base assembly; a warning signal frame secured to said signal frame support and being swingable with said support from a retracted position adjacent the base assembly to an upright signaling position, the free end portion of said frame being provided with a spacer element to space said free end portion from the supporting base assembly and from the base assembly of a superposed warning signal when the signal frame is in retracted position, the other end portion of said frame being spaced from said supporting base assembly by the rear leg portion and from the base assembly of a superposed warning signal by said front leg portion; and co-operating latch portions on said signal frame support and on said front end portion of the supporting base assembly positioned for latching engagement when said signal frame is swung to upright signaling position, the latch portions and the hinged connection of the signal frame support being spaced longitudinally of the supporting base assembly to afford spaced support for the signal frame in upright signaling position.

3. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced supporting position; a signal frame support hingedly connected to the front end portion of the supporting base, said support having a signal frame mounting surface; a warning signal frame secured to said mounting surface and swingable with said signal frame support from a retracted position adjacent said supporting base assembly to an upright signaling position; and latch portions on said signal frame support and on said front end portion of the supporting base assembly positioned for cooperative latching engagement when said signal frame is swung to upright signaling position, the latch portions and the hinged connection of the signal frame support being spaced longitudinally of the supporting base assembly to afford spaced support for the signal frame in upright signaling position, the signal frame support being of channel-shaped configuration affording front and rear leg portions and extending laterally of the front end portion of the supporting base assembly, the rear leg portion being hingedly connected to the supporting base assembly, and the front leg portion carrying one of the latch portions for engaging the other cooperating latch portion on the supporting base assembly, whereby the warning signal frame is afforded spaced support when in upright signaling position.

4. A foldable support for a warning signal as specified in claim 3, in which the rear leg portion abuts the supporting base assembly when the signal frame is in retracted position to space one end of the signal frame from said base assembly, and a spacer element is secured to the free end of the signal frame to space said free end from the supporting base assembly when the signal frame is in retracted position.

5. A foldable support for a warning signal, comprising: a supporting base assembly having a first supporting leg and a pair of secondary supporting legs each provided with a pin for pivotally securing said secondary supporting legs to said first supporting leg, said secondary legs being juxtaposed with said first leg when in retracted position and being swingable forwardly to a laterally spaced supporting position; a latch plate secured to said supporting base by said pins of the secondary legs; a signal frame support swingably connected to said latch plate, said support being provided with a signal frame mounting surface; a warning signal frame secured to said mounting surface and swingable with said signal frame support from a retracted position adjacent said supporting base to an upright signaling position; and cooperating latch portions on said signal frame support and on said latch plate for latching said signal frame in upright signaling position, the signal frame support being channel-shaped in configuration affording front and rear leg portions and extending laterally of the front end portion of the supporting base assembly, the rear leg portion being hingedly connected to the supporting base assembly, and the front leg portion carrying one of the latch portions for engaging the other latch portion on the latch plate, whereby the warning signal frame is afforded spaced support when in upright signaling position.

References Cited in the file of this patent

UNITED STATES PATENTS

| 325,551 | Lukens | Sept. 1, 1885 |
| 1,220,758 | Lamphiear | Mar. 27, 1917 |
| 1,262,712 | Stone | Apr. 16, 1918 |
| 2,436,298 | Gunderson | Feb. 17, 1948 |
| 2,464,031 | Fiedel | Mar. 8, 1949 |
| 2,704,974 | Setman | Mar. 29, 1955 |
| 2,735,637 | Tolbert | Feb. 21, 1956 |